Jan. 30, 1962  C. MARCHETTI  3,019,030
MECHANICAL VIBRATION DAMPING SYSTEM
Filed Dec. 8, 1958

INVENTOR.
CARLO MARCHETTI
BY
ATTORNEY.

3,019,030
MECHANICAL VIBRATION DAMPING SYSTEM
Carlo Marchetti, Paris, France, assignor to Societe Industrielle de Mecanique et Carrosserie Automobile-Simca, Paris, France, a French company
Filed Dec. 8, 1958, Ser. No. 778,953
Claims priority, application France Dec. 7, 1957
2 Claims. (Cl. 280—124)

This invention relates to systems for damping mechanical vibrations, and has particular though not exclusive reference to such systems forming part of automotive vehicles.

A mechanical system including a mass component and a spring component constitutes an oscillatory or vibrational system having a definite natural frequency as determined by the values of the mass and spring rate. When such a system is excited by vibrations applied to it from some external source at a frequency approaching said natural frequency, the system will tend to resonate and to vibrate at an ever-increasing amplitude so that it will be bound ultimately to fail mechanically, unless some suitable vibration damping means are associated with the system. An object of this invention is to provide an improved form of vibration damping means of this character.

In various mechanical assemblies, vibration-susceptible components may be present in pairs, with both components of the pair having the same values of mass and spring rate and hence the same natural frequencies. One notable example of such an assembly is provided by a pair of wheels, say the front wheels, of a motor car. Both assemblies, each comprising a wheel and its tire, constitute two identical vibratory systems having the same natural frequencies. Road shocks constitute external vibrations applied to the vibrational systems, and even where the amplitudes of such external vibrations are small, as they are if the car is driving over a smooth road, it will at times happen that the random frequency of the road shocks coincides rather accurately with the natural frequencies of the wheel systems, so that inordinately large shocks and impact stresses are imposed on the vehicle chassis and on the occupants of the car.

It is a specific object of this invention to provide improved damping or shock-absorbing means for the wheels of automotive vehicles which will be simple to construct, easy to service, efficient and rugged. Another specific object is to provide an improved vibration damping device involving both wheels of a front or rear pair. It will be understood however that the invention is not restricted to the wheels of automotive vehicles, but is broadly applicable wherever two, or more mechanical vibrational systems are present having substantially similar natural frequencies and positioned at a comparatively small distance from one another.

According to the invention, a vibration damping device for a pair of vibrational systems comprises a damping mass, and a spring connected to said mass and to both said systems so as to simultaneously damp the vibrations thereof.

The spring of the improved damping device which is connected to both vibrational systems is desirably in the form of a leaf spring having its ends connected to the two systems to be damped, and loaded at its center with the damping mass.

A damping device according to the invention will operate correctly both when the two virbrational systems to be damped are oscillating in phase with and out of phase from each other, and with the same or with different amplitudes.

An exemplary embodiment of the invention as applied to a motor-car will now be described for purposes of illustration but not of limitation with reference to the accompanying diagrammatic drawing, wherein.

Figure 1:
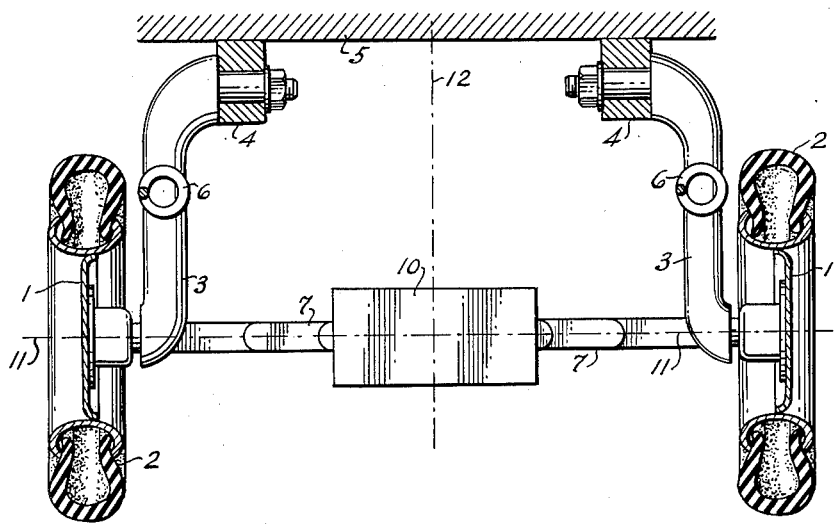
FIG. 1 is a plan view illustrating a pair of motor-car wheels and associated suspension means and an improved damping device associated therewith.

As shown in the drawings, a pair of automobile wheels 1 are fitted with pneumatic tires 2 and are rotatably journalled upon the outwardly projecting spindle ends of arms 3 the opposite ends of which are formed as trunnions journalled in bearing brackets 4 secured to the chassis 5 of the car. Interposed between a midpoint of each arm 3 and an area of the chassis overlying it, is a suspension spring 6, which is shown as a compression coil spring.

In accordance with the invention, a laminated leaf spring 7 is disposed transversely of the chassis and has each of its ends pivotally connected to the lower end of the two end pivots 9 of a related vertical link 8, the upper end pivot of which is pivotally connected to a point on the related one of the arms 3. The laminated spring 3 is loaded at its center with a mass 10.

The arrangement is such the center of gravity of the assembly comprising mass 10 and spring 7 is normally positioned substantially at the intersection between the transverse wheel axis 11 and the longitudinal midplane of the car. The reference numeral 12 designates an axis extending through said center of gravity and lying in said longitudinal midplane.

Figure 2:
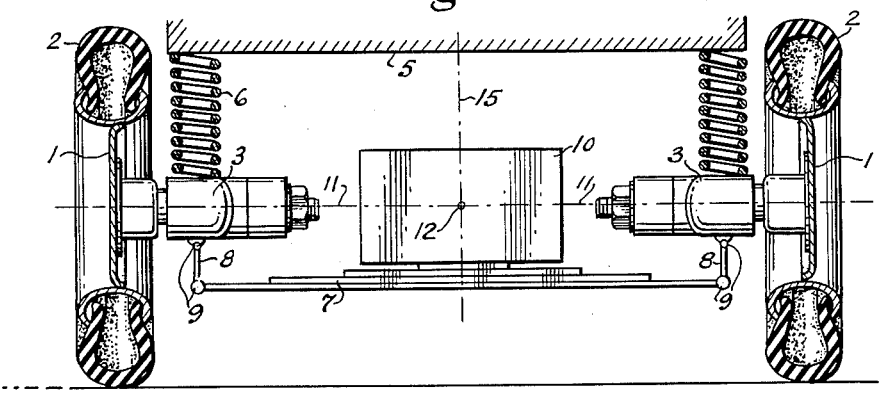
FIG. 2 is an elevation corresponding to FIG. 1.
Figure 3:
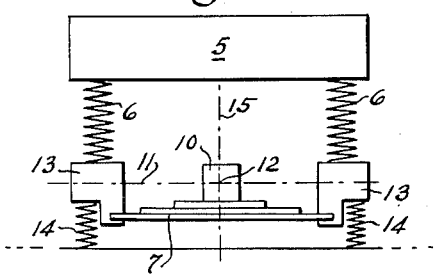
FIG. 3 illustrates equivalent diagrams explanatory of the operation of the invention when the vibrations imparted to both wheels are in phase.

The mechanical assembly thus provided can be represented as the simplified equivalent system shown in FIG. 3, where the masses 13 represent the combined masses of the wheels, tires, and the parts of the arms 3 attached to the wheels. The springs 14 represent the tires considered as mass-less springs. The springs 6 represent the suspension springs designated by the same numeral in FIGS. 1 and 2.

Referring to FIG. 3, when the vehicle is in motion over a more or less rough or uneven surface the two systems each comprising a mass 13 and a spring 14 are separately excited by the shocks generated by unevenness of the road surface, and should the frequency of such shocks approximate the natural frequency of these oscillatory systems the masses 13 are subjected to large-amplitude vibrations which are then transmitted through the suspension springs, as well as through the conventional shock-absorbers (not illustrated), interposed between the wheels and the chassis, to the chassis 5 of the vehicle as reaction forces and stresses capable of attaining objectionable and dangerously high values. The function of the arrangement of the invention comprising the laminated spring 7 and mass 10 is to minimize the vibrations of the masses 13 when these tend to vibrate at their natural frequency as explained above. The stiffness of the spring 7 and the weight of the mass 10 are predetermined at suitable values for this purpose in accordance with well-known rules of vibration theory.

The mass 10 and spring 7 in turn constitute a vibrational system but its vibrational amplitude is normally very low, and the vibrations thereof are readily damped out by the frictional effect of the leaves of laminated spring 7 against one another; if desired however a pair of small shock absorbers of any suitable design may be interposed between the arms 3 and the mass 10.

Considering now the operation of the system in somewhat greater detail it is seen that such operation is not the same when the vertical motions of the two wheels 1 of the vehicle are being effected in phase with each other as when such motions are out of phase with each other. Where both wheels are moving in phase and with the same amplitude, i.e. are rising and falling by similar amounts simultaneously, the mass 10 will have exclusively vertical movements applied to it so that it will oscillate along the vertical axis 15. If on the other hand the wheels are moving in out-of-phase relation, with one wheel rising while the other is falling, the mass 10 tends to be rotated about the axis 12. In the first instance just considered, i.e. in phase movement of the wheels, the operation of the system is effected straight-forwardly in the manner explained above in connection with FIG. 3. However, in the second instance of out-of-phase wheel motion, such operation will appear more conveniently by reference to the modified equivalent system shown in FIG. 4.

Figure 4:
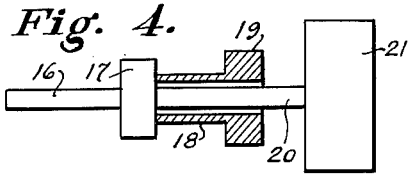
FIG. 4 is another equivalent diagram explaining the operation of the improved damping device when the vibrations imparted to the pair of wheels are out of phase.

Referring to FIG. 4, when the wheels 1, or the masses 13 in FIG. 3, are alternately rising and falling in out-of-phase relationship, their combined mass can be considered as a single mas which is reciprocating in angular rotation about the axis 12, and it is this common mass which is indicated in FIG. 4 as a "flywheel" 17. The springs 14 of FIG. 3, which corresponded to the tires 2, are represented in FIG. 4 by a torsional shaft 16 on which the mass 17 is secured and which has a torsional spring stiffness corresponding to the stiffness of the springs 14. The masses 13 of FIG. 3 as already stated are represented in FIG. 4 by the rotating mass 17 which acts by its moment of inertia; the cross-spring 7 of the invention is represented in FIG. 4 by the torsional tubular shaft 18; the mass 10 of FIG. 3 is represented in FIG. 4 by the rotating mass 19 secured on the end of the torsional shaft 18, and acting by its moment of inertia; the suspension springs 6 of FIG. 3 are represented in FIG. 4 by the further torsional shaft 20; and finally the chassis 5 is represented in FIG. 4 as the rotating mass 21 acting by its moment of inertia.

In the equivalent system shown in FIG. 4, all vibrational movements are rotational and the system comprising the tubular torsional spring shaft 18 (i.e. spring 7) and flywheel mass 19 (i.e. mass 10) acts to dampen out torsionally the vibrations of the system comprising torsion shaft 16 and mass 17.

In order to accomplish the object of the invention for both boundary cases described above, i.e. both for in-phase and out-of-phase motions of the wheels, it is necessary that the mass 10 should not only have a predetermined mass M, but also a predetermined moment of inertia J about its axis of inertia 12 as will be apparent from the above explanation given in connection with FIG. 4. This condition can readily be achieved in accordance with a feature of the invention by imparting to the mass 10 a more or less elongated shape along the transverse axis 11, since such a modified shape will alter the moment of inertia of the mass 10 without altering its mass. Thus both the proper values of J and M can separately be obtained which will satisfy the mathematical requirements of the system.

It will be understood of course that in general the motions of both wheels 1 will neither be exactly in phase nor exactly in opposition or out-of-phase relation, so that the mass 10 will actually perform a compound movement, including a vertical component along the axis 15 during the time the wo wheels are moving in the same direction, and a rotational component about the axis 12 during such times as the wheels are moving in opposite directions. However all such intermediate conditions arising in practice will be adequately taken care of provided the system has been predetermined to satisfy the boundary requirements described above.

According to an additional and advantageous aspect of the invention, when applied to an automotive vehicle, the mass 10 may be provided by some useful component normally present on board the vehicle, such as a storage battery, a transmission box, or a differential gearing, or any other suitable unit.

It will be obvious that many other refinements and modifications of the invention may readily be conceived within the scope of the appended claims.

What I claim is:
1. In an automotive vehicle; the combination of a chassis, a pair of road wheels, support means rotatably supporting said wheels from said chassis and being movable relative to the latter suspension spring means between said support means for each of said wheels and said chassis so that said wheels and the related suspension spring means form the mass and spring components of two mechanical vibrational systems having substantially equal natural frequencies, a leaf spring connected at its opposite ends only to said support means of the respective wheels, and a mass free to move relative to said chassis and loading said leaf spring substantially at the midpoint thereof so that said leaf spring and mass loading the latter form a vibrational damping arrangement for said two mechanical vibrational systems.

2. In an automotive vehicle; the combination of a chassis, a pair of road wheels, support means rotatably supporting said wheels from said chassis and being movable relative to the chassis, suspension spring means between said support means for each of said wheels and said chassis so that said wheels and the related suspension spring means form the mass and spring components of two mechanical vibrational systems having substantially equal natural frequencies, said suspension spring means tending to position said support means relative to said chassis so that said wheels rotate about a substantially common transverse axis of the vehicle, a leaf spring connected at its opposite ends to said support means of the respective wheels, and a mass free to move relative to the chassis and loading said leaf spring substantially at the midpoint thereof so that said leaf spring and mass loading the latter form a vibrational damping arrangement for said two mechanical vibrational systems, said leaf spring and said mass loading the latter having a center of gravity positioned substantially on said transverse axis.

References Cited in the file of this patent

UNITED STATES PATENTS

| | | |
|---|---|---|
| 1,783,348 | Taylor | Dec. 2, 1930 |
| 2,016,207 | Lindenberg | Oct. 1, 1935 |
| 2,018,653 | Best | Oct. 29, 1935 |
| 2,085,006 | Coleman | June 29, 1937 |
| 2,578,702 | Hellwig | Dec. 18, 1951 |
| 2,697,613 | Giacosa | Dec. 21, 1954 |
| 2,744,749 | Fiedor | May 8, 1956 |

FOREIGN PATENTS

| | | |
|---|---|---|
| 1,161,498 | France | Mar. 24, 1958 |
| 1,173,879 | France | Oct. 27, 1958 |
| 757,064 | Germany | Mar. 23, 1953 |
| 883,243 | Germany | July 16, 1953 |
| 724,449 | Great Britain | Feb. 23, 1955 |